UNITED STATES PATENT OFFICE.

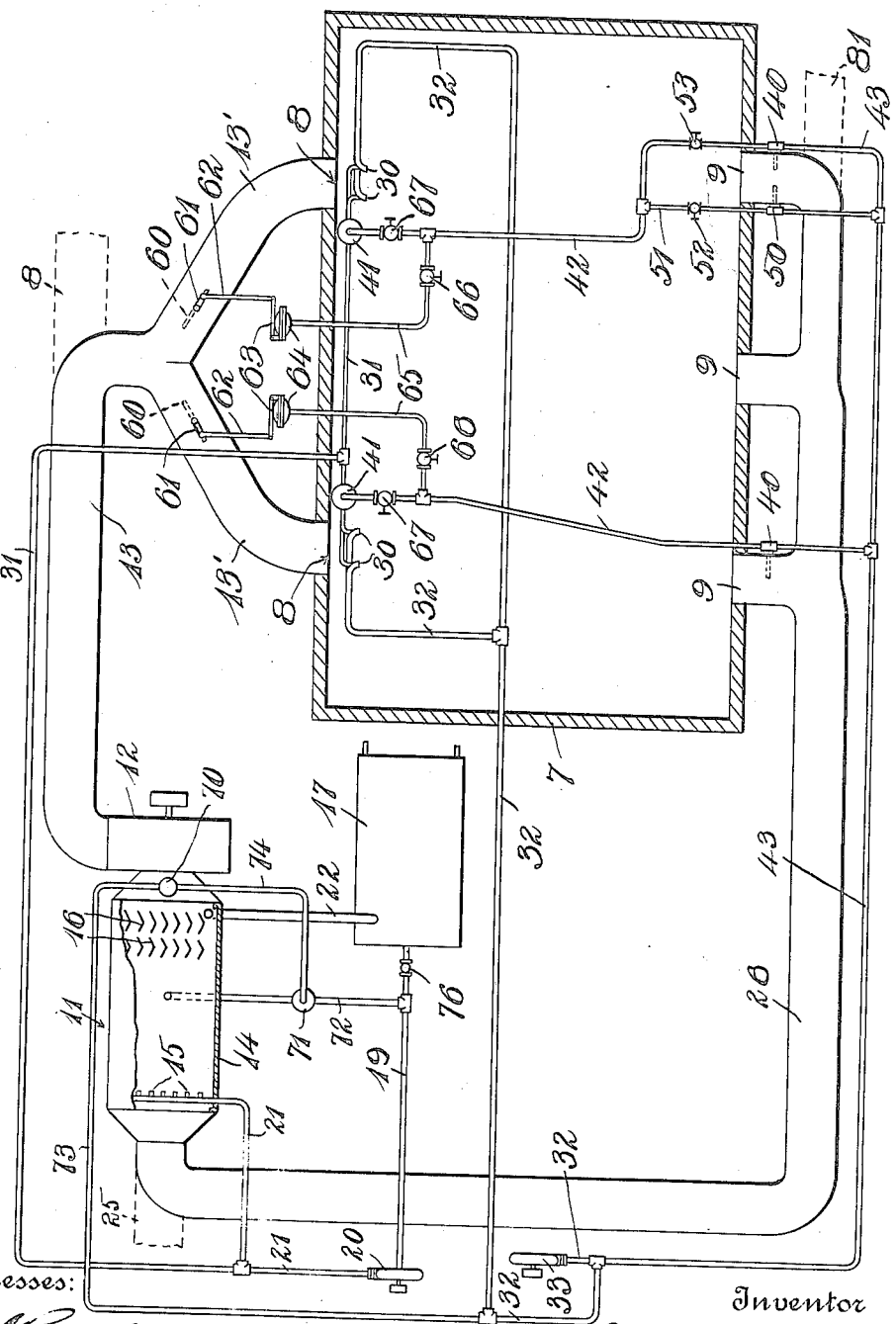

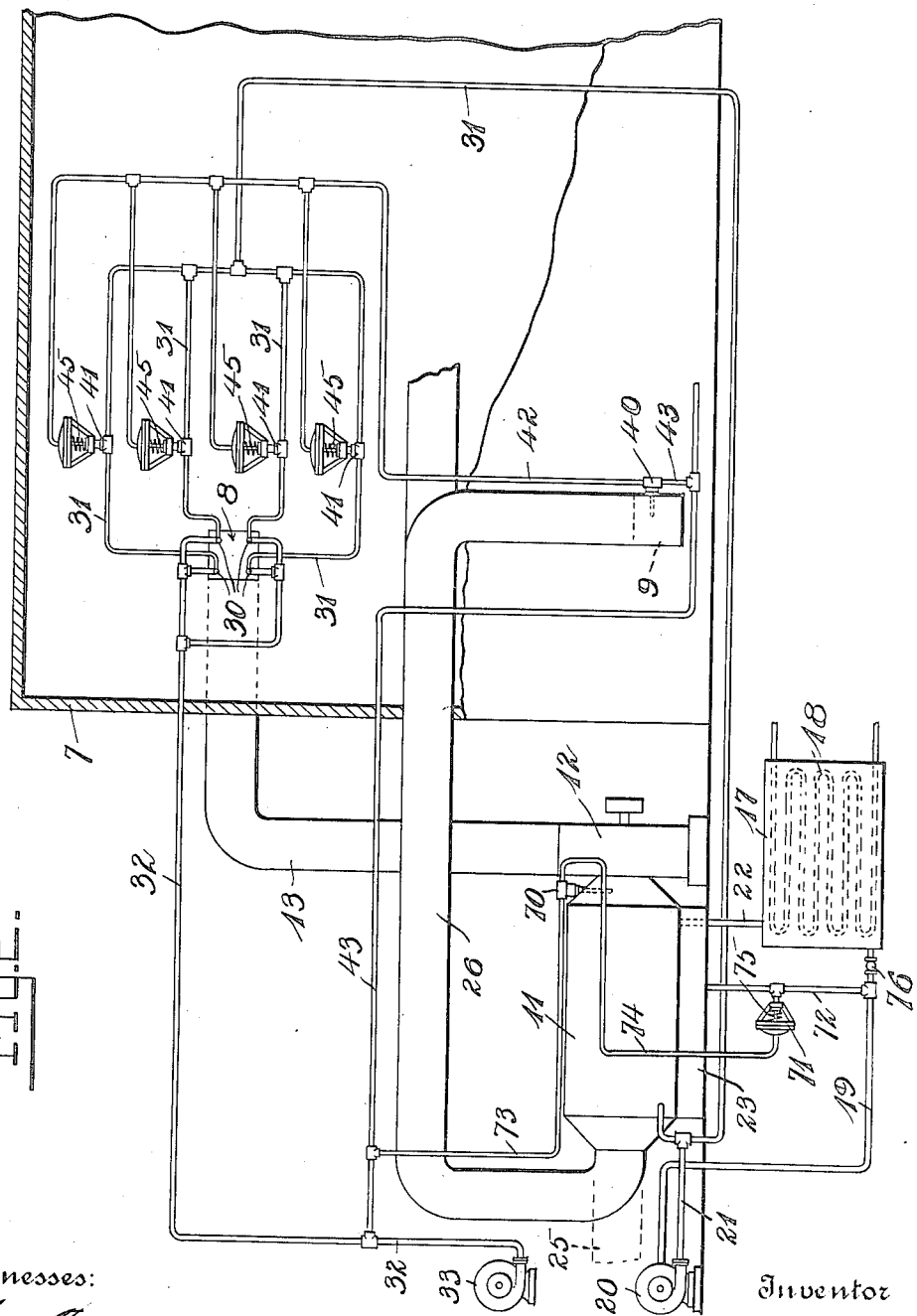

SAMUEL C. BLOOM, OF ELIZABETH, NEW JERSEY.

REFRIGERATION.

1,236,535.

Specification of Letters Patent.  Patented Aug. 14, 1917.

Application filed May 15, 1915. Serial No. 28,304.

*To all whom it may concern:*

Be it known that I, SAMUEL C. BLOOM, a citizen of the United States of America, and residing at Elizabeth, in the county of Union and State of New Jersey, have invented new and useful Improvements in Refrigeration, of which the following is a specification.

This invention relates to the art of refrigeration and is especially adapted to the chilling and preserving of fresh meat, fish, vegetables and the like. For convenience of disclosure the invention will be described herein particularly in connection with the chilling and preserving of freshly killed beef.

The present methods of chilling and preserving fresh beef, by storing the carcasses in refrigerating chambers, are imperfect and wasteful. During the period in which the temperature of a freshly killed beef is reduced from that of body temperature to the required temperature for proper preservation, usually 33 to 36 degrees Fahrenheit, and during the entire time the beef is preserved at the required temperature, a considerable loss in weight occurs by reason of the natural meat juices evaporating, being carried away by the refrigerated air circulating around the carcasses and in turn deposited upon the refrigerating coils or other form of cooler provided for chilling the air so circulated. This evaporation aside from occasioning the loss in weight, detracts more or less from the natural quality, condition and appearance of the meat.

Special objects of my invention are to prevent or reduce loss in weight during the chilling and preserving processes and to maintain as nearly as possible the original conditions of the beef.

In addition to such special objects my invention aims to improve the art of refrigeration generally by making it possible to chill rapidly and preserve with little or no loss of weight, any substance containing liquid or liquids in physical combination therewith.

In the carrying out of my invention the substance under treatment is placed in a chamber and immersed in a refrigerated circulating gaseous fluid, such as air, into which atomized liquid has been introduced in quantity and condition to be carried in suspension, or, the liquid is sprayed directly upon the substance. The liquid is preferably refrigerated and of like kind to that which it is desired to prevent evaporating from the substance under treatment. As the temperature of the gaseous fluid increases after leaving the source of refrigeration, by reason of heat absorbed from the walls of the chamber, artificial lights, the substance under treatment or other sources, the avidity and capacity of said gaseous fluid for absorbing vapor are correspondingly increased. The liquid sprayed upon the substance or suspended in the gaseous fluid serves to gratify the increased avidity and capacity of the said gaseous fluid for vapor of the said liquid, so that the liquid contained in the substance is prevented from evaporating because it encounters resistance in reaching the surfaces of the substance exposed to the gaseous fluid, whereas the liquid, sprayed upon the substance or carried in suspension by the gaseous fluid, is in a favorable condition for evaporation. By supplying fresh, cooled, gaseous fluid as fast as required to take up heat given off by the substance under treatment such substance is rapidly chilled practically without loss in weight and without deterioration or if simply being stored, is kept at the desired minimum temperature without loss of weight or deterioration.

My invention embodies also special means for the carrying out of the process outlined above, such means comprising in general means for cooling a gaseous fluid, such as air and introducing such cooled fluid into a refrigerating chamber and means for introducing into the chamber with such fluid a refrigerated liquid in the form of a fine spray, mist or fog. Other features comprise means for automatically controlling the admission of the refrigerating medium in accordance with conditions within the refrigerating chamber, such means herein taking the form of thermostats or humidistats located in the path of circulation of the refrigerating medium and controlling through suitable connections the admission of the refrigerated liquid, or the cooled air or both liquid and air.

In the accompanying drawings I have illustrated a preferred form of apparatus for practising the invention but it will be understood that the process may be practised by other means than those shown and that changes may be made without departing from the true spirit and scope of the invention and further that the terms employed are used in a descriptive rather than in a limiting sense, except as may be required by the prior art.

Figure 1, is a plan view in more or less diagrammatic form of a chilling plant designed for carrying out the invention, the chilling room and the air cooler being shown in section.

Fig. 2, is a diagrammatic side elevation of the same with parts shown on a somewhat larger scale.

In the apparatus disclosed, 7 designates the chilling room which may be specially constructed after the manner of cold storage and refrigerating chambers in use at the present time. Opening into the chamber, preferably the upper portion thereof, are one or a number of inlets 8 for the cooled air and the chamber is provided, preferably in the lower portion thereof and in the wall farthest from the inlets, with one or a number of outlets 9.

The cooled air may be supplied by any suitable means, such as the air cooling device indicated at 11 and fan 12, said fan being direct-connected to the discharge end of the cooler and connected by conduit 13 to the inlets 8. The cooler illustrated is of the spray type embodying a casing 14 having spray nozzles 15 in the entrance end thereof and bafflers or "eliminators" 16 in the opposite end for extracting surplus moisture from the air cooled by passage through the spray.

The spray liquid, usually water, may be suitably cooled to the temperature necessary to cool the air to the proper degree, as by means of a cooling tank 17, having brine or other cooling coils 18 therein. The refrigerated water is in the illustration, taken from this tank through suction pipe 19 by a pump 20 and forced by said pump through a supply pipe 21 to the spray nozzles. A drain pipe 22 permits the sprayed water to drain from the bottom 23 of the cooler back into the cooling tank.

The air may be drawn into the cooler directly from the surrounding atmosphere, as through a passage indicated in dotted lines at 25. Preferably however the cooled air is used over and over again by simply providing a conduit 26 from the exit or exits 9 of the chill room back to the intake end of the cooler.

Refrigerated liquid is introduced with the cooled air into the chill room by suitable means, such means here taking the form of atomizing nozzles 30 located at the air inlets 8 and supplied with refrigerated liquid by piping 31 and with an atomizing fluid such as compressed air by piping 32. The refrigerated liquid may be supplied from the same tank which furnishes the liquid for the spray nozzles, in which event the supply pipe 31 may be connected with the pipe 21 leading from the pump 20. The compressed air for atomizing may be supplied by a pump or blower 33.

The supply of refrigerating medium may be controlled manually but more uniform and satisfactory results are obtained by controlling such supply automatically and directly in accordance with the conditions existing within the refrigerating chamber. In the illustration automatic control is provided by thermostats 40 located in the outlets 9 and controlling valves 41 which govern the flow of refrigerated water to the atomizing nozzles 30. Fluid pressure connections 42 are shown between the thermostats and the control valves 41, said valves being illustrated as diaphragm valves. Compressed air may be used as the actuating fluid, it being in such case conveniently supplied through piping 32—43 from the pump 33 which supplies the compressed air to the atomizing nozzles.

The thermostats and diaphragm valves may be of any standard type and they are so constructed and arranged that when the temperature at the outlets is higher than freezing or the minimum low temperature at which it is desired to maintain the products, they will operate to maintain or increase the supply of refrigerated liquid and when the temperature at the outlets is lowered or corresponds to the minimum low temperature desired, will operate to decrease or shut off the supply of such fluid. The diaphragm valves may thus be of the "normally open" type, held open by their springs 45, and the thermostats may operate upon reduction in temperature to open up flow of fluid under pressure which by acting on the diaphragms will serve to close the valves and thus shut off flow of refrigerated liquid to the nozzles. By adjusting the tension of the diaphragm springs 45 the diaphragm valves may be caused to operate sequentially and thus to regulate the supply of refrigerated liquid more or less gradually.

Other control may be substituted in place of the thermostatic control. Thus for instance humidistats may be used in lieu of the thermostats or in conjunction therewith. In the illustration a humidistat is indicated at 50 exposed to the exhaust current from one of the outlets 9, supplied with air under pressure from pipe line 43 and connected with one of the diaphragm controlling valves by piping 51—42. As the outflow at the exit becomes de-humidified, indicating the taking place within the chamber of an interchange of heat, the humidistat operates to control the diaphragm valve to admit more moisture and vice versa. The humidistat or thermostat may be cut into and out of operation by means of hand valves 52, 53 respectively in the pipe lines connecting them with the diaphragm.

The amount of cooled air introduced into the chamber may be governed, as a further or other means of control. Thus in the illustration I have shown dampers or valves 60 in the branches 13′ of the cooled air supply conduit 13, having operating cranks 61, connected by links 62 to the levers 63 of the diaphragm controllers 64. These diaphragm controllers are connected by piping 65—42 with the thermostats, humidistats or other controlling devices employed. The control by this means is similar in a general way to the control operations already described. Upon a lowering of temperature at the outlets the thermostat or other control element admits or increases flow of actuating fluid to the diaphragm controller which acts through the connections described to close off or throttle the cooled air supply. Reverse conditions cause a reverse operation. Hand valves 66 and 67 may be provided in the fluid pressure supply connections for cutting the cooled air control or the refrigerated liquid control respectively into or out of operation.

The supply of cooled air will preferably also be maintained at the requisite low temperature by automatic means. Such means is shown in the illustration in the form of a thermostat 70 exposed to the flow of cooled air supplied by the fan and controlling a diaphragm valve 71 which governs supply of the refrigerated spray liquid to the spray nozzles of the air cooler. The diaphragm valve 71 is interposed in a pipe connection 72 between the collecting tank 23 of the cooler and the pipe 19 leading from the refrigerated water supply tank 17. The thermostat is shown supplied with actuating fluid through pipe connections 32—73 and connected with the diaphragm valve by pipe 74. In this case the diaphragm valve is of the normally closed type so that the pump 20 normally draws its supply of refrigerated water direct from the supply tank through pipe 19. Upon lowering in temperature of the cooled air below a certain predetermined point, the thermostat 70 operates to admit pressure to the diaphragm valve 71 which thereupon opens up the pipe 72, placing the pump in communication with the drainage tank of the cooler. This being the course of least resistance, the pump now draws its supply from the somewhat warmer drain water in the tank. As the air is again restored to the proper temperature the thermostat allows the diaphragm valve to again close under the action of its spring 75 and the pump then draws its supply from the refrigerating tank. A check valve 76 interposed in the pipe 19 leading from the refrigerating tank prevents any backflow through this pipe into the tank.

It will be obvious that one or a number of refrigerating chambers may be served by the same apparatus by simply continuing the connections or conduits as indicated in dotted lines at 80 and 81 in Fig. 1.

My invention will be seen to embody the prevention of loss of natural moisture from the meat and consists in introducing to the air in which the meat is immersed, cold water preferably so fine as to be carried in suspension by the air.

As the air temperature increases through the absorption of heat from all sources in the refrigerating chamber, the atomized liquid gratifies the increased avidity and capacity of the air for vapor, resulting from such increased temperature, and as the evaporation of the atomized liquid results from the transformation of sensible heat in the air to latent heat of vaporization of the atomized liquid, the temperature of the air is prevented from rising to the degree that it would if such atomized liquid were not present. The maintenance of the required air temperature is thus facilitated.

It will be understood that the scope of my invention includes not only the refrigerating and preserving of meats in the manner set forth, but includes any substance containing water or other liquid or liquids immersed in any kind of gaseous fluid best adapted to the substance for the purpose set forth, that is, the prevention of loss of weight by evaporation of the liquid or liquids contained in the substance and being accomplished by spraying the substance or super-saturating the gaseous fluid in which the substance is immersed with atomized liquid or liquids or vapor thereof, the evaporation of which like liquid or liquids contained in the substance it is desired to reduce or prevent.

The expression "super-saturated" is used as a convenient term to designate that condition of air wherein it is fully saturated with vapor and in addition carries atomized liquid in suspension.

What I claim is:—

1. The herein described process which comprises introducing a liquid in a finely divided state directly into contact with the substance to be treated and supplying additional finely divided liquid to said substance at a rate substantially corresponding to the rate at which the previously supplied liquid has become evaporated whereby to preserve the substance without substantial loss of the original moisture in the substance.

2. The process of refrigerating comprising flowing a moisture-laden cooled gaseous refrigerating medium past a substance to be chilled and automatically supplying moisture to said medium in accordance with the rate at which the moisture in the medium is evaporated through contact with the substance being cooled.

3. The process of refrigeration which comprises, cooling a gaseous refrigerating medium, super-saturating said cooled gaseous medium with a liquid and circulating said super-saturated cooled gaseous medium about the material to be treated.

4. The process of refrigerating which comprises, flowing a moisture-laden, cooled, gaseous refrigerating medium past the substance to be treated, withdrawing said medium from said substance, re-cooling said medium and reintroducing the same with added moisture content to the substance under treatment.

5. The process of chilling meat which comprises cooling air and introducing said cooled air with vaporous refrigerated water into contact with the meat.

6. In the art of refrigerating, flowing a current of moisture-laden cooled gaseous refrigerating medium past a substance under treatment and supplying fresh moisture to said current in accordance with the condition of the medium after having flowed past the substance.

7. In combination with a refrigerating chamber, means for circulating a refrigerated liquid in a finely divided state through said chamber and means for automatically maintaining substantially constant temperature conditions within said chamber.

8. In combination with a refrigerating chamber, means for introducing a cooled gaseous medium into said chamber, means for introducing a refrigerated liquid in a finely divided state into the chamber with said cooled gaseous medium and means for automatically controlling the supply of refrigerated liquid in accordance with the conditions within the chamber.

9. In combination with a refrigerating chamber, means for introducing a cooled gaseous medium into said chamber, means for introducing a refrigerated liquid in a finely divided state into the chamber with said cooled gaseous medium and means for automatically controlling the supply of cooled gaseous medium in accordance with the conditions within the chamber.

10. In combination with a refrigerating chamber, means for introducing a cooled gaseous medium into said chamber, means for introducing a refrigerated liquid in a finely divided state into the chamber with said cooled gaseous medium, means for automatically controlling the supply of refrigerated liquid in accordance with the conditions within the chamber and means for automatically controlling the supply of cooled air.

11. In combination with a refrigerating chamber, means for circulating a refrigerated liquid in a finely divided state through said chamber and thermostatically controlled means for automatically controlling the supply of said refrigerated liquid.

12. In combination with a refrigerating chamber, means for circulating a refrigerated liquid in a finely divided state through said chamber, and humidistatically controlled means for automatically controlling the supply of said refrigerated liquid.

13. In combination with a refrigerating chamber provided with an inlet and an outlet, means for supplying a refrigerated liquid in a finely divided state at said inlet and automatic control means located at said outlet and exercising a control over the supply of refrigerated liquid.

14. In combination with a refrigerating chamber, a plurality of atomizing nozzles arranged to discharge into said chamber, sequentially operating valves controlling said nozzles and control means subjected to conditions within the chamber and exercising control over said valves.

15. In combination with a refrigerating chamber, means for introducing a cooled gaseous medium into said chamber, means for introducing a refrigerated liquid in a finely divided state into the chamber with said cooled gaseous medium and means for controlling the supply of refrigerated liquid in accordance with the conditions within the chamber.

SAMUEL C. BLOOM.

Witnesses:
R. G. MITCHELL,
C. J. HACHENBERG.